United States Patent [19]

Herrington et al.

[11] Patent Number: 4,980,388

[45] Date of Patent: Dec. 25, 1990

[54] USE OF CARBON DIOXIDE ADDUCTS AS BLOWING AGENTS IN CELLULAR AND MICROCELLULAR POLYUREAS

[75] Inventors: Ronald M. Herrington, Brazoria; Robert B. Turner, Lake Jackson; James R. Porter, Lake Jackson; Ralph D. Priester, Jr., Lake Jackson, Tex.

[73] Assignee: The Dow Chemical Company, Midland, Mich.

[21] Appl. No.: 258,940

[22] Filed: Oct. 17, 1988

[51] Int. Cl.$^5$ .......................... C08G 18/08; C08J 9/08
[52] U.S. Cl. ................................. 521/130; 521/131; 521/163; 521/164
[58] Field of Search ................ 521/163, 164, 130, 131

[56] References Cited

U.S. PATENT DOCUMENTS

| | | | |
|---|---|---|---|
| 2,855,384 | 10/1958 | Lehmann et al. | 528/68 |
| 3,256,213 | 6/1966 | Guitter et al. | 521/112 |
| 3,425,964 | 2/1969 | Stanley | 521/128 |
| 3,499,872 | 3/1970 | Thoma et al. | 528/60 |
| 3,607,837 | 9/1971 | Reegen | 525/409 |
| 3,635,908 | 1/1972 | Vogt et al. | 528/62 |
| 3,714,047 | 1/1973 | Marion et al. | 252/62 |
| 3,789,027 | 1/1974 | Träubet et al. | 521/63 |
| 3,834,578 | 9/1974 | Smith et al. | 220/378 |
| 3,864,402 | 2/1975 | Swanson et al. | 564/497 |
| 3,868,350 | 2/1975 | Reiff et al. | 525/440 |
| 3,971,785 | 7/1976 | Messina et al. | 264/268 |
| 3,980,594 | 9/1976 | Fabris et al. | 521/129 |
| 4,077,920 | 3/1978 | Yukuta et al. | 521/117 |
| 4,102,801 | 7/1978 | Brodoway | 252/182 |
| 4,136,241 | 1/1979 | Ammann | 521/163 |
| 4,282,330 | 8/1981 | Austin | 521/118 |
| 4,284,728 | 8/1981 | Demou et al. | 521/155 |
| 4,292,226 | 9/1981 | Wenzel et al. | 524/591 |
| 4,297,442 | 10/1981 | Blahak | 521/107 |
| 4,417,002 | 11/1983 | Liessem | 521/128 |
| 4,467,089 | 8/1984 | Bechara | 544/351 |
| 4,469,856 | 9/1984 | Rasshofer et al. | 528/45 |
| 4,499,038 | 2/1985 | Schäfer et al. | 264/51 |
| 4,500,656 | 2/1985 | Rasshofer et al. | 521/164 |
| 4,506,039 | 3/1985 | Ballé et al. | 521/137 |
| 4,517,313 | 5/1985 | Nakatani | 521/51 |
| 4,520,042 | 5/1985 | Smith | 427/209 |
| 4,525,590 | 6/1985 | Rasshofer et al. | 544/222 |
| 4,532,266 | 7/1985 | Rasshofer et al. | 521/159 |
| 4,542,214 | 9/1985 | Bechara | 544/107 |
| 4,645,630 | 2/1987 | Rasshofer et al. | 264/54 |
| 4,725,636 | 2/1988 | Kausch et al. | 524/251 |
| 4,735,970 | 4/1988 | Sommerfeld et al. | 521/128 |

FOREIGN PATENT DOCUMENTS

| | | |
|---|---|---|
| 37527 | 7/1973 | Australia . |
| 145250 | 6/1985 | European Pat. Off. . |
| 1570571 | 7/1969 | Fed. Rep. of Germany . |
| 1339356 | 12/1973 | United Kingdom . |

OTHER PUBLICATIONS

Smola, "Basicity of Organic Amines and Their Salt Formation with Weak Acids", Mitt.chem.Forsch.—Inst. Ind. Osterr.; Jul. 1948; pp. 38–40.

Chemical Abstracts; vol. 43; 1949, 6157.

Chemical Abstracts; vol. 108; 1988; page 37; 108(14): 113484c.

The Journal of the American Chemical Society; vol. 73; Apr. 1951; pp. 1829–1831.

*Primary Examiner*—Maurice J. Welsh
*Assistant Examiner*—Rabon Sergent
*Attorney, Agent, or Firm*—Carol J. Cavender; Barbara J. Sutherland

[57] ABSTRACT

A polyurea foam is formed from a reaction mixture comprising at least one polyisocyanate component and an active hydrogen component, wherein active hydrogen compounds of relatively high equivalent weight have an average of about 1.5 to about 10 active hydrogen-containing groups per molecule, of which active hydrogen-containing groups: an average of (a) from about 5 to about 60 percent are primary or secondary aliphatic amine groups or (b) at least about 25 percent are primary aromatic, Lewis acid-blocked primary aliphatic, secondary aliphatic or aromatic amine groups or mixtures thereof. Carbon dioxide is adducted to said active hydrogen component. The adduct releases carbon dioxide to blow the foam.

15 Claims, No Drawings

USE OF CARBON DIOXIDE ADDUCTS AS BLOWING AGENTS IN CELLULAR AND MICROCELLULAR POLYUREAS

BACKGROUND OF THE INVENTION

This invention relates to polyurea foams. More specifically, it concerns compositions and processes useful in preparing polyurea foams.

Polyurea foams are advantageously prepared using amine terminated polyethers. Such foams are well known in the art and are taught, for instance, in U.S. Pat. Nos. 3,838,076 to Hotchkiss et al.; 4,396,729 to Dominguez et al.; 4,433,067 to Rice et al.; 4,444,910 to Rice et al.; 4,474,901 to Dominguez; 4,530,941 to Turner et al.; 4,642,320 to Turner et al.; 4,588,840 to Gurgiolo; 4,732,919 to Grigsby it al.; European Patent Nos. 81,701 and 255,371; copending U.S. application Ser. No. 170,971 filed Mar. 21, 1988.

Polyurea foams have many uses. They are generally advantageous when relatively high load bearing strengths are needed. In flexible foams, the advantages of polyurea formulations over polyurethane formulations that produce similar load bearing characteristics frequently include lower isocyanate index, lower viscosity because copolymer polyols are often unnecessary, and less foam shrinkage since less crosslinker is generally required. Additionally, polyurea foams offer greater latitude in the amount of water that can be used without marked shrinkage and generally require crushing after molding less often than do polyurethane foams.

Flexible polyurea foams are used in a wide variety of applications, particularly as cushioning such as in automobile seats, headrests, dashboards and the like, in furniture, bedding, carpet padding, packaging, toys and the like. Rigid polyurea foams are particularly useful in insulation, for instance for vessels, pipelines, ice chests, appliances, buildings and the like.

Formation of polyurea foams typically requires a blowing or nucleating agent to achieve a CELLULAR structure and/or a preselected density. Frequently, such foams are water-blown, but often water alone is insufficient to achieve a preselected density. Using water alone may also be disadvantageous when the water required would increase the exotherm of a foaming mass sufficiently to degrade the foam. Chlorofluorocarbons have proven useful as blowing agents in polyurea foams, but use of alternative blowing agents is sometimes favored.

There have been some teachings of using compounds which may liberate carbon dioxide on heating to contribute to the blowing of polyurethane foams. For instance, U.S. Pat. No. 4,417,002 discloses use of certain salts of formic acid and a weak organic base to liberate carbon dioxide and carbon monoxide for foam formation. U.S. Pat. No. 3,635,908 teaches the addition of certain polyamine carbamates to certain polyurethane formulations to form thermoplastic polyurethane-ureas which are extruded under specified conditions. U.S. Pat. Nos. 4,077,920 and 4,500,656 disclose certain polyurethane foams prepared using certain amine carbamates of amines having alcoholic hydroxy groups. U.S. Pat. No. 4,284,728 discloses certain high resiliency polyurethane foam formulations wherein acids or carbon dioxide are used to stabilize certain reactive amines. U.S. Pat. Nos. 4,499,038 and 4,645,630 disclose preparation of certain polyurea-based MICROCELLULAR moldings prepared by reaction injection molding (RIM) processes using certain aliphatic amine compounds having ammonium carbamate groups.

The above patents disclose processes or compositions by or from which certain amounts of potentially available carbon dioxide may be released for blowing at certain temperatures. Several of the processes and compositions require that certain amines, often amines with hydroxyl groups, be added to higher molecular weight active hydrogen compounds in specific polyurethane formulations. Addition of such compounds, which generally behave as chain extenders, increases the hard segments in a polyurethane foam and changes the physical properties thereof. Frequently, the load bearing strength is increased while tensile, tear and elongation are lowered. Since the amount of carbon dioxide available is limited by the number of amine groups reacted therewith, obtaining more blowing from carbon dioxide requires use of more of these compounds and, therefore, more change in physical properties.

It would be desirable to use, as a blowing agent, a material which would form, in the course of polyurea formation, a gas suitable for foaming and a compound reactive in polyurea formation. Preferably the compound would be one normally used in a polyurea formulation, rather than an added compound.

SUMMARY OF THE INVENTION

In one aspect, the invention is a process of preparing a polyurea foam by reacting a reaction mixture containing at least one polyisocyanate component and an active hydrogen component, wherein active hydrogen compounds of relatively high equivalent weight have an average of about 1.5 to about 10 active hydrogen-containing groups per molecule, of which active hydrogen-containing groups an average of (a) from about 5 to about 60 percent are primary or secondary aliphatic amine groups (b) at least about 25 percent are primary aromatic, Lewis acid-blocked primary aliphatic, secondary aliphatic or aromatic amine groups or mixtures of such groups, said relatively high equivalent weight active hydrogen compounds having adducted thereto sufficient carbon dioxide to produce a foam having a preselected density.

In another aspect, the invention is an active hydrogen composition, wherein active hydrogen compounds of relatively high equivalent weight have an average of from about 1.5 to about 10 active hydrogen-containing groups per molecule, of which active hydrogen-containing groups: an average of at least about 25 percent are primary aromatic, Lewis acid-blocked primary aliphatic, secondary aliphatic or aromatic amine groups or mixtures thereof, at least about 10 mole percent of said amine groups being adducted with carbon dioxide.

It has been found that such active hydrogen compositions are useful both in forming polyureas and providing gas for foam formation.

DETAILED DESCRIPTION OF THE INVENTION

This invention involves preparation of polyurea foams. The term polyurea foams is used to designate those foams formed from a polyisocyanate component and an active hydrogen component wherein relatively high equivalent weight compounds or mixture thereof have an average of about 1.5 to about 10, preferably from about 1.7 to about 8, more preferably from about 1.8 to about 5, active hydrogen-containing groups per molecule, of which active hydrogen-containing groups: an average of (a) from about 5 to about 60 percent are primary or secondary aliphatic amine groups or (b) at least about 25 percent are primary aromatic, Lewis acid-blocked primary aliphatic, secondary aliphatic, primary aromatic, secondary aromatic amine groups or mixtures thereof. These ranges of averages are the number averages over all relatively high equivalent weight compounds in the active hydrogen component. Said relatively high equivalent weight compounds having the listed amine groups are referred to herein as an "amine-terminated compounds." The term "relatively high equivalent weight" is used to refer to equivalent weights greater than about 200. The equivalent weight of the amine-terminated compound used depends somewhat on the particular type of foam being prepared, but is advantageously from about 200 to about 5000 and, preferably, from about 200 to about 2500, more preferably 400 to 2500. Preparation of polyurea foams from amine-terminated compounds is disclosed, for instance, in U.S. application Ser. No. 170,971 filed Mar. 21, 1988, and U.S. Pat. No. 3,838,076 which are incorporated herein by reference in their entireties. It is recognized that polyurea foams optionally have groups such as urethane groups as well as urea groups.

When the amine-terminated compounds are Lewis acid blocked, preferably fewer than 100 mole percent of the amine groups are blocked so that the carbon dioxide adducts can form on unblocked amine groups. Alternatively, a Lewis acid is used which can be replaced, at least partially, by carbon dioxide.

Among amine-terminated compounds, those having aromatic amine groups or Lewis Acid blocked amine groups are preferred; those with primary or secondary aromatic amine groups, more preferred; those with primary aromatic amine groups, most preferred. Among aliphatic amine groups, secondary amine groups are more preferred because they generally react sufficiently slowly to allow a mold to fill. Preferred compounds include nominally trifunctional poly(oxyalkylene) polyethers such as poly(oxyethylene) and/or poly(oxypropylene) having equivalent weights as previously discussed and being amine capped with such compounds as nitrobenzenes which are subsequently reduced. Also preferred are amine terminated polyethers having suitable equivalent weights and commercially available from Texaco Chemical Co. under the trade designation Jeffamine ®.

The amine-terminated compound is, optionally, mixed with other active hydrogen compounds to form an active hydrogen component. Active hydrogen compounds are compounds having hydrogen-containing functional groups which will react with an isocyanate group. The Zerewitinoff test described by Kohler in the *Journal of the American Chemical Society*, Vol. 49, page 3181 (1927) predicts the tendency of a hydrogen-containing group to react with isocyanates. Suitable active hydrogen components are described in U.S. application Ser. No. 170,971 and specifically include, in addition to amine-terminated compounds: polyols, chain extenders and crosslinkers. When polyols or other relatively high equivalent weight active hydrogen compounds are used, they are used in proportions which result in mixtures of relatively high equivalent weight compounds having proportions of amine groups within previously discussed ranges.

Crosslinkers include alkanolamines and other compounds of about 200 or lower equivalent weight having about 3-8, preferably about 3-4 active hydrogen-containing groups per molecule. Chain extenders are compounds having two active hydrogen-containing groups per molecule and an equivalent weight from about 31 to about 300. Chain extenders and crosslinkers having at least one primary or secondary amine functional group are preferred for use in the practice of the invention. In a flexible foam, a crosslinker and/or chain extender is, preferably, present in an amount less than about 5 parts by weight per 100 parts of the relatively high equivalent weight components, including amine-terminated compounds and polyols. In rigid foams, however, sufficient chain extender and, especially, crosslinking agent is present to achieve a crosslink density suitable for producing desired physical properties. While crosslinkers are sometimes used as the entire active hydrogen component in making a rigid foam, in the practice of this invention, chain extenders and crosslinkers preferably are less than about 75 weight percent, more preferably less than about 50 percent of the active hydrogen component.

The active hydrogen component is admixed with a polyisocyanate component and allowed to react to form a polyurea. Polyisocyanate components suitable for use in the practice of the invention are organic compounds that contain at least two isocyanate groups. Suitable polyisocyanate components, too, are described in U.S. application Ser. No. 170,971. Preferred polyisocyanates include toluene diisocyanate (TDI), methylene diphenylene isocyanate (MDI) and polymeric methylene diphenylisocyanate (PMDI).

The polyisocyanate is used in an amount sufficient to provide an isocyanate index of about 60-200, preferably about 90-125, more preferably about 95-110. At higher indices, trimerization of the polyisocyanate occurs, causing the foam to lose flexibility. At lower indices, insufficient curing occurs, causing the foam to have poor properties. When MDI or derivatives thereof are used as the polyisocyanate, preferred isocyanate indices are from about 60-110, with 70-103 being more preferred, as MDI tends to provide a board-like foam at indices greater than about 110, but provides a highly resilient foam at indices as low as about 60. The "isocyanate index" is 100 times the ratio of isocyanate groups to active hydrogen-containing groups contained in the mixture which reacts to form the foam.

A blowing agent is used to generate the gas or vapor for bubbles in foam formation. In the practice of the invention, carbon dioxide adducts of the amine terminated compounds are used as blowing agents which release carbon dioxide.

The term "adduct" is used to designate the intermolecular association between carbon dioxide and amine-terminated compound, preferably formed in the substantial absence of water. The type of intermolecular association may be a reaction product, a complex or other association. An adduct having ionic association, referred to herein as a salt, is believed to be formed in the substantial absence of water; whereas in the presence of water, ammonium carbamates are generally formed.

Sufficient water to produce preselected physical properties, particularly density, in a foam is acceptable. However, it is preferable to avoid excess water which may increase a foam's exotherm and degrade the foam or may increase the load bearing strength in excess of a desired value. One source of water to be preferably avoided is the water liberated by ammonium carbamates.

Carbon dioxide adducts of the amine terminated compounds are formed by contacting carbon dioxide with the amine terminated compounds such that the adducts are formed. Preferably, for convenience, atmospheric or near atmospheric pressure is used. More preferably, the pressure is just above atmospheric pressure as provided by a sparger, or similar device, with sufficient carbon dioxide flow to displace ambient air. At those pressures, temperatures of from about 0° to about 80° C., preferably from about 20° to about 50° C., are generally advantageous.

Methods of contacting between the carbon dioxide and amine-terminated compounds are not critical to the invention. For instance, carbon dioxide may be bubbled (sparged) through the amine terminated compound or a suspension or solution thereof, for instance, a solution in a relatively high equivalent weight polyol. Alternatively, the carbon dioxide may be added to the amine terminated compound or solution thereof in the form of dry ice. Carbon dioxide can replace nitrogen in storage tanks where relatively high equivalent weight amine-terminated compounds or compositions thereof are stored. Alternatively, carbon dioxide can be injected into the amine-terminated compounds using a circulation pump or similar equipment. Regardless of the method used to achieve contact between carbon dioxide and the amine-terminated compound, it is important that there be intimate contact between the two so that sufficient quantities of adduct can be formed. Stirring or agitation is therefore, generally preferred. Agitation may, however, be achieved by introduction of gaseous carbon dioxide such that there is turbulence.

Advantageously, at least about 0.5 equivalents of carbon dioxide is contacted with the amine terminated compound. There is no upper limit to the amount of carbon dioxide that may be contacted with the amine terminated compound. When there is efficient contact between amine and carbon dioxide, it is generally unnecessary to use more than the amount of carbon dioxide which dissolves in the amine-terminated compound and other materials admixed therewith, plus about one mole of carbon dioxide per two amine groups of the amine terminated compound. The adducts are generally formed in the ratio of one mole of carbon dioxide to two amine groups. Preferably, sufficient carbon dioxide to replace other dissolved gases and to nucleate bubbles for a foam is present in excess of the amount required to form adducts.

Maximum density reduction from the use of carbon dioxide is generally achieved by reaction of from about 0.2 to about 0.5 mole of carbon dioxide per equivalent of amine-terminated compound. Use of relatively less carbon dioxide results in relatively less blowing from the carbon dioxide and generally higher density foams. Use of active hydrogen compounds which are not adducted with carbon dioxide in addition to the adducts similarly generally results in higher density foams. In each case, lower densities are suitably achieved by use of other (auxiliary) blowing agents.

The amount of adduct employed should be sufficient to achieve a preselected amount of foaming of the reaction mixture. Said amount will vary with factors such as the preselected density desired in a foamed product. Polyurea foams are cellular polyureas advantageously having densities from about 0.5 to about 50 pounds per cubic foot (pcf). Average cell diameters of the foams are larger than those of microcellular polyurethanes or polyureas, that is they are advantageously greater than about 0.001 mm, preferably greater than about 0.002 mm. This invention is applicable to both flexible and rigid polyurea foams, but flexible foams are preferably produced. Flexible polyurea foams preferably have densities from about 0.5 to about 5, more preferably from about 1 to about 4 pcf. Rigid polyurea foams preferably have densities of from about 2 to about 45 pcf. Flexible foams are foams which do not rupture when a 200×25×25 mm sample is bent around a 25 mm mandrel at a uniform rate of one lap in 5 sec at a temperature between 18° and 29° C., according to ASTM 1566-82. A rigid foam is one which ruptures under those conditions. In general, a flexible foam has a tensile strength to compressive strength ratio of about 15–70:1 whereas the same ratio for a rigid foam is on the order of about 1:0.5

Polyurea foams include molded and free rise foams. Molded foams are manufactured by reacting polyurea-forming components in a closed mold to produce foams having a predetermined shape. Free rise foams are manufactured such that foaming polyurea-forming components rise freely against their own weight, such as on a conveyor belt or in an open mold, for instance. Free rise foams include foams often referred to as slabstock foams.

One or more catalysts are beneficially used in making polyurea foams. Suitable catalysts are described in U.S. application Ser. No. 170,971 which is incorporated herein by reference.

Additives such as surface active agents, antistatic agents, plasticizers, fillers, flame retardants, pigments, stabilizers such as antioxidants, fungistatic and bacteriostatic substances and the like are optionally used in polyurea foams produced according to the practice of the invention.

For instance, in producing polyurea foams by the process of the invention, foam stabilizers are optionally used according to procedures known in the art. Suitable foam stabilizers are generally wetting agents or surface active agents. Suitable foam stabilizers include nonionic surfactants, wetting agents, organo-silicon compounds and the like. Exemplary foam stabilizing compounds are disclosed, for instance, in U.S. Pat. Nos. 2,764,565; 3,887,500 and 3,957,842. Such foam stabilizers, surface active compounds and combinations thereof are generally commercially available with specific instructions as to their use. Additional detail regarding using such additives in polyurea foams is given in U.S. application Ser. No. 170,971. Cell regulating additives are also suitable for use in the practice of the invention and include paraffins, fatty alcohols, dimethylpolysiloxanes and the like.

Water or other blowing agents or mixtures thereof are, optionally, used as auxiliary blowing agents with the carbon dioxide adducts in the practice of the invention. In a flexible foam, water is preferably used in an amount sufficient to supply at least half of the moles of gas used in blowing, that is, water is the primary blowing agent. Other auxiliary blowing agents are optionally used with water and the carbon dioxide adducts. In rigid foams, water is optionally used, but other auxiliary blowing agents are generally preferred over water. Other suitable blowing agents include blowing agents which are volatile at temperatures reached in the foaming process, blowing agents which react or split to form gases, and dispersed inert gases. Suitable organic blowing agents include compounds having boiling points within the range of temperatures reached in foam formation such as acetone; ethyl acetate; methanol; ethanol; halogen substituted alkanes (preferably having less than about three carbon atoms) such as methylene chloride, chloroform and the like; chlorofluorocarbons (preferably having less than about two carbon atoms) such as tricholorofluoromethane, chlorodifluoromethane, dichlorodifluoromethane and the like; butane; hexane; heptane; diethyl ether; and the like. Gases inert to the starting components such as nitrogen, air and the like are also useful blowing agents. Compounds such as azides which decompose at temperatures present in the mold to produce gases such as nitrogen are also useful. For production of foams having physical properties generally desirable in most applications, such as cushioning, preferred auxiliary blowing agents are the halogenated alkanes and chlorofluorocarbons and the like. Chlorofluorocarbons particularly "hard" chlorofluorocarbons (those chlorofluorocarbons having no hydrogen atoms) are preferably used in quantities less than would be used in the absence of the carbon dioxide/amine-terminated compounds, most preferably, no hard chlorofluorocarbons are used.

In foams produced according to the practice of the invention, a cell opener is optionally used. Compounds useful as cell openers and methods of their use is generally known in the art. Exemplary cell openers include fumed silica and certain polyether polyols having relatively high proportion of ethylene oxide units, relatively high functionality and relatively high equivalent weights such as are disclosed in copending U.S. application Ser. No. 186,418 to Nichols et al., filed Apr. 26, 1988, which application is incorporated herein by reference in its entirety. Processes for the use of other cell openers are known to those skilled in the art and available from the suppliers thereof.

Cell openers are generally used in amounts sufficient to produce foams having preselected air flow measurements. Air flow is a measure of the air which will pass through a foam. It is measured according to ASTM D 3574-86 in cubic feet per minute (cfm) (1 cfm is about 0.47193 liters per second (l/sec)). In the case of flexible, free rise foams, the air flow measurements are preferably at least about 2 cubic feet per minute, preferably, from about 2 cfm to about 7 cfm (about 0.9 to 3.3 l/sec). Flexible molded foams advantageously have air flows of from about 0.1 cfm to about 7 cfm, preferably from about 1 cfm to about 6 cfm. Rigid foams used for insulation are generally preferably closed cell foams.

Several characteristics of foams indicate aspects of their formation and properties. Cream time, rise time and blow off are routinely measured during foam production. Cream time is classically defined as the time from introduction of polyisocyanate components into active hydrogen components until a foaming mass changes from clear to opaque. Rise time is the time from introduction of polyisocyanate components into active hydrogen components until a foam completes its rising, that is, until the foam reaches its greatest volume. A free rise foam generally completes its rising at blow off, which is when carbon dioxide and other gases are released. Occurrence of blow off generally indicates that a balanced foam formulation has been used.

The following examples are offered only for purposes of illustrating the process of the invention and are not to be viewed as limiting the present invention. All parts and percentages are on a weight basis unless otherwise indicated. Examples of the invention are designated numerically. Comparative samples are not examples of the invention and are designated with alphabetic characters and are indicated by the abbreviation "CS"

In the examples below, load bearing strength is generally measured as IFD, the force required to compress a foam sample of designated thickness to a given percentage of that thickness, by the procedures of ASTM D 3574-86, except that the sample sizes are as indicated. When the sample is relatively small, the compressive load deflection (CLD) is measured according to ASTM D 3574-86; it differs from the IFD in that pressure is applied over the entire surface of the foam rather than to a limited area thereof. A foam sample for measurement of IFD is generally 15×15×4.5 inches when molded to that size or 13×13×4 inches when cut from a large enough slab. In the tables, indentation force deflection is indicated by IFD4 or IFD4.5, where the 4 and 4.5 refer to the thickness in inches of the exterior sides of the samples. The forces required for compression to 25% and 65% of the thickness are measured and are referred to as the 25% IFD and 65% IFD, respectively. IFD is reported as pounds per 50 square inches which is equivalent to Newtons per 332 square centimeters.

Compression set refers to a measurement of the percentage of height regained after compression to one level, for instance 50% of the thickness, for a period of about 22 hours as described in ASTM D-3574-86. A sample 2×2×1 inches generally cut from the center of a sample is used for density measurement except where otherwise indicated.

EXAMPLES 1-4 AND COMPARATIVE SAMPLES A-C: USE OF AN ADDUCT OF CARBON DIOXIDE AND A SECONDARY ALIPHATIC AMINE-TERMINATED POLYETHER.

A secondary amine-terminated polyether is prepared by reacting an aliphatic primary amine-terminated poly(propylene oxide) polyether of about 5000 molecular weight, nominal triol, commercially available from Texaco Chemical Co. under the trade designation Jeffamine ® T-5000 with acrylonitrile until essentially all primary amine groups are converted to secondary amine groups. To form the secondary amine, about 4600 g of the amine-terminated poly(propylene oxide) polyether is mixed with about 1120 g methanol and sparged with nitrogen. About 1600 g of acrylonitrile is added slowly to the vigorously agitated mixture. No temperature rise is observed. When addition of acrylonitrile is complete, the temperature is raised from ambient to 40° C. and held there for about 12 hours. Vacuum and heat of about 100° C. are used to remove methanol and residual acrylonitrile until neither shows in a gas chromatograph.

About 4500 g of the secondary amine-terminated polyether is placed in a stirred reaction vessel and sparged with carbon dioxide at ambient temperatures, under slightly above one atmosphere of pressure of carbon dioxide to exclude air. Sparging is continued for about 9 hours to form an adduct of carbon dioxide and the amine-terminated polyether.

Foams are made by mixing the components indicated in Table 1 at about 78° F. Then sufficient toluene diisocyanate (TDI) having an isomer ratio of 80% 2,4 diisocyanate to 20% 2,6 diisocyante, commercially available from The Dow Chemical Company under the trade designation Voranate ® T-80, for a 105.5 index is blended into the amine terminated compound mixture. The weights of reaction mixture indicated in Table 2 are injected into a 15"×15"×4.5" mold which is preheated to 140° F. After the mixture is in the mold, the mold is closed and immediately placed into a 250° F. oven for 4 minutes, after which the resulting foam is demolded. After cooling, the physical properties of the foams are determined to be as indicated in Table 3.

TABLE 1

| Components in Parts by Weight | EX. 1 | EX. 2 | EX. 3 | EX. 4 | CS A* | CS B* | CS C* |
|---|---|---|---|---|---|---|---|
| $CO_2$ Adduct of Amine-terminated Polyether | 100 | 100 | 100 | 100 | 0 | 0 | 0 |
| Amine-terminated Polyether | 0 | 0 | 0 | 0 | 100 | 100 | 100 |
| Silicone Surfactant[1] | 1.3 | 1.3 | 1.3 | 1.3 | 1.3 | 1.3 | 1.3 |
| diethanolamine | 1.5 | 1.5 | 1.5 | 1.5 | 1.5 | 1.5 | 1.5 |
| Water | 3.8 | 3.8 | 3.8 | 3.8 | 3.8 | 3.8 | 3.8 |
| Catalyst A[2] | 0.24 | 0.24 | 0.24 | 0.24 | 0.24 | 0.24 | 0.24 |
| Catalyst B[3] | 0.075 | 0.075 | 0.075 | 0.075 | 0.075 | 0.075 | 0.075 |
| Catalyst C[4] | 0.24 | 0.24 | 0.24 | 0.24 | 0.24 | 0.24 | 0.24 |
| Catalyst D[5] | 0.004 | 0.004 | 0.004 | 0.004 | 0.004 | 0.004 | 0.004 |

*Not an example of this invention.
[1]Y-10184 surfactant, sold by Union Carbide Corporation.
[2]DABCO 33LV, a 33% by weight solution of trietylene diamine in dipropylene glycol, commercially available from Air Products and Chemicals.
[3]NIAX A-1, a 70% by weight solution of bis(dimethylaminoethylether) in dipropylene glycol, commercially available from Union Carbide Corp.
[4]POLYCAT 77, pentamethyl dipropylene triamine, commercially available from Air Products and Chemicals.
[5]FOMREZ UL-1, dibutyltin dimercaptide, commercially available from Witco Chemical Co.

Examples 1–4 differ from one another in the amounts of reaction mixture injected into the mold. Comparative Samples A-C differ analogously. Reaction mixture is injected at a constant rate for the number of seconds indicated in Table 2 to produce a total weight indicated in the table.

TABLE 2

| Property | EX 1 | EX 2 | EX 3 | EX 4 | CS A* | CS B* | CS C* |
|---|---|---|---|---|---|---|---|
| weight in g | 485 | 478 | 460 | 450+ | 525 | 482+ | 460++ |
| shot time sec. | 1.52 | 1.46 | 1.40 | 1.37 | 1.69 | 1.52 | 1.46 |
| density lb./ft$^3$ | 1.92 | 1.89 | 1.75 | 1.68 | 1.98 | 1.92 | |
| Tensile Str., psi[1] | 13.7 | 16.2 | 12.3 | 12.9 | 19.3 | 16.6 | |
| Elongation, %[1] | 146 | 145 | 141 | 139 | 170 | 163 | |
| Tear Str.[2], lb/in | 1.2 | 1.3 | 1.3 | 1.4 | 1.3 | 1.2 | |
| Resiliency, %[3] | 44 | 49 | 50 | 52 | 52 | 45 | |
| Compression Set, 75%[4] | 14 | 12 | 16 | 16 | 14 | 16 | |
| IFD[5] | | | | | | | |
| 25% | 16 | 16 | 18 | 16 | 18 | 14 | |
| 65% | 52 | 53 | 50 | 47 | 56 | 49 | |
| ret. to 25% | 12 | 13 | 14 | 12 | 14 | 11 | |
| % Hysteresis Return[5] | 75 | 77 | 77 | 76 | 80 | 78 | |
| Modulus[6] | 3.17 | 3.22 | 2.83 | 2.96 | 3.15 | 3.43 | |
| Air Flow, ft$^3$/min[7] | 3.9 | 4.9 | 5.0 | 5.3 | 3.5 | 7.6 | |

*Not an example of this invention.
[1]ASTM D-3574-81 Test E.
[2]ASTM D-3574-81 Test F.
[3]ASTM D-3574-81 Test H.
[4]ASTM D-3574-81 Test D.
[5]ASTM D-3574-81 Test B. IFD is indentation force deflection.
[6]Modulus = 65% IFD/25% IFD.
[7]ASTM D-3574-81.
++Mold underfilled and sample not testable.
+Mold minimally filled, little flash observed.

The Data in Table 2 shows that use of an adduct of carbon dioxide and an amine-terminated polyether allows production of lower density molded foams while retaining physical properties generally within acceptable ranges, including compression set and load bearing strength. This is accomplished using less total reaction mixture (compare a shot time of 1.37 sec. in Ex. 4 with a shot time of 1.52 sec. in C.S. B. for minimum filling of the mold) and without use of additional isocyanate or volatile blowing agents, such as chlorofluorocarbons.

EXAMPLES 5–7 and COMPARATIVE SAMPLE D: FOAMS PREPARED USING A CARBON DIOXIDE ADDUCT OF AN AROMATIC AMINE-TERMINATED POLYETHER An aromatic amine-terminated polyether is prepared by reacting a poly(propylene oxide) polyether nominal triol having an average molecular weight of about 5000 with o-nitrochlorobenzene and subsequently reducing the nitro groups to primary amine groups. Over 90% of the hydroxyl groups are converted to primary aromatic amine groups. An adduct is formed between carbon dioxide and the amine-terminated polyether by the procedure of Example 1.

For Examples 5–7, foams are produced using the procedure of Example 1, except that 0.05 parts by weight of DCF1-1630 and 1 part by weight DC 5043, both silicone surfactants commercially available from Dow Corning Corp., are used in place of the silicone surfactant of Example 6; 0.48 parts Catalyst C and 0.002 parts Catalyst D per hundred parts amine-terminated polyether or carbon dioxide adduct thereof are used. The adduct is used in the Examples 5-7, and the aromatic amine terminated polyether is used for Comparative Sample D. The isocyanate index is 105. Comparative Sample D and Example 7 are observed to have minimal flash but to fill the mold. Example 5 has excessive flash, and Example 6 has average flash. Shot times and physical properties of the foams produced are given in Table 3.

TABLE 3

| Property | Sample Number | | | |
|---|---|---|---|---|
| | CS D* | EX 5 | EX 6 | EX 7 |
| sample weight, g | 506 | 448 | 450 | 430 |
| shot time, sec | 1.788 | 1.788 | 1.625 | 1.365 |
| rise time, sec | 25 | 27 | 31 | 52 |
| Density, lb/ft$^3$ | 1.85 | 1.63 | 1.66 | 1.54 |
| Tensile Str., psi[1] | 19.0 | 16.5 | 17.1 | 14.2 |
| Elongation, %[1] | 156 | 143 | 147 | 150 |
| Tear Str., lb/in[2] | 1.30 | 1.34 | 1.6 | 1.78 |
| Resiliency, %[3] | 50 | 47 | 45 | 47 |
| Compression Set, 50% CD[4] | 20.1 | 26.4 | 33.4 | 23.4 |
| Compression Set, 75% CD[4] | 17.9 | 22.7 | 38.3 | 20.1 |
| Humid Aged Compression Set[4] | 40.0 | 44.0 | 47.0 | 44.0 |
| IFD[5] | | | | |
| 25% | 21 | 19 | 17 | 19 |
| 65% | 60 | 51 | 50 | 50 |
| ret. to 25% | 16 | 14 | 13 | 14 |
| % Hysteresis Return[5] | 77 | 73 | 74 | 73 |
| Modulus[6] | 2.87 | 2.71 | 2.89 | 2.66 |
| Air Flow, cf/min[7] | 2.8 | 3.8 | 2.0 | 3.6 |

[1]ASTM D-3574-81 Test E.
[2]ASTM D-3574-81 Test F.
[3]ASTM D-3574-81 Test H.
[4]ASTM D-3574-81 Test D.
[5]ASTM D-3574-81 Test B. IFD is indentation force deflection.
[6]Modulus = 65% IFD/25% IFD.
[7]ASTM D-3574-81.
*Not an example of this invention.

The data in Table 3 shows that use of carbon dioxide adducts of the amine-terminated polyether allow production of lower density foams at equal shot times (compare C.S. D and Example 5). Examples 6 and 7 with shorter shot times show that less material can be used to produce foams of lower density without undesirably increasing load bearing strength (IFD) or compression sets. Other physical properties are also within desirable ranges.

We claim:

1. A process of preparing a polyurea foam by reacting in the substantial absence of ammonium carbamates, a reaction mixture containing at least one polyisocyanate component and an active hydrogen component, wherein active hydrogen compounds of relatively high equivalent weight have an average of about 1.5 to about 10 active hydrogen-containing groups per molecule, of which active hydrogen-containing groups: an average of (a) from about 5 to about 60 percent are primary or secondary aliphatic amine groups or (b) at least about 25 percent are primary aromatic amine groups; Lewis acid-blocked primary aliphatic, secondary aliphatic or aromatic amine groups; or mixtures of such groups; said relatively high equivalent weight active hydrogen compounds having adducted thereto sufficient carbon dioxide to produce the foam having a preselected density and wherein the resulting adducted carbon dioxide functions as a blowing agent.

2. The process of claim 1 wherein there is additionally present in the reaction mixture at least one chain extender or crosslinker.

3. The process of claim 2 wherein at least one chain extender or crosslinker is also adducted with carbon dioxide.

4. The process of claim 2 wherein the chain extender or crosslinker is an alkanolamine having an equivalent weight of less than about 200.

5. The process of claim 1 wherein, of the active hydrogen-containing groups, at least about 25 percent are primary or secondary aromatic amine groups.

6. The process of claim 1 wherein, of the active hydrogen-containing groups, at least about 25 percent are secondary aliphatic amine groups.

7. The process of claim 1 wherein, of the active hydrogen-containing groups, at least about 25 percent are Lewis acid blocked primary aliphatic amine groups.

8. The process of claim 1 wherein, of the active hydrogen-containing groups, from about 5 to about 60 percent are primary aliphatic amine groups.

9. The process of claim 1 wherein the amine groups are adducted with carbon dioxide in the substantial absence of water.

10. The process of claim 1 wherein an auxiliary blowing agent is used.

11. The process of claim 10 wherein the auxiliary blowing agent is selected from the group consisting of water, halogen substituted alkanes, chlorofluorocarbons and mixtures thereof.

12. The process of claim 1 wherein the foam is a flexible or rigid foam and the density is preselected to be from about 0.5 to about 40 pounds per cubic foot.

13. The process of claim 12 wherein the foam is a flexible foam and the density is preselected to be from about 1 to about 4 pounds per cubic foot.

14. The process of claim 12 wherein the foam is a rigid foam and the density is preselected to be from about 2 to about 40 pounds per cubic foot.

15. The process of claim 1 wherein no auxiliary blowing agent is used.

* * * * *